(12) United States Patent
Scheckel et al.

(10) Patent No.: US 11,173,500 B2
(45) Date of Patent: Nov. 16, 2021

(54) BEARING PLATE ASSEMBLY WITH A DRIVE JET FOR A SEPARATION ASSEMBLY

(71) Applicant: CUMMINS FILTRATION IP, INC., Columbus, IN (US)

(72) Inventors: Benjamin L. Scheckel, Stoughton, WI (US); Ganesh Kn, Pune (IN); Amol Sukhdev Gangadhare, Sangola (IN)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/144,294

(22) Filed: Jan. 8, 2021

(65) Prior Publication Data
US 2021/0121896 A1    Apr. 29, 2021

Related U.S. Application Data

(63) Continuation of application No. PCT/US2019/041364, filed on Jul. 11, 2019.

(30) Foreign Application Priority Data

Jul. 12, 2018 (IN) .......................... IN201841026032

(51) Int. Cl.
*B04B 9/06* (2006.01)
*B01D 19/00* (2006.01)
(Continued)

(52) U.S. Cl.
CPC ............ *B04B 9/06* (2013.01); *B01D 19/0031* (2013.01); *B01D 19/0052* (2013.01);
(Continued)

(58) Field of Classification Search
CPC .. B04B 9/06; B04B 9/12; B04B 5/005; F01M 13/04; F01M 2013/0422; B01D 19/0031; B01D 19/0052
See application file for complete search history.

(56) References Cited

U.S. PATENT DOCUMENTS

| 2,338,779 A | 1/1944 | Mutch |
| 6,017,300 A * | 1/2000 | Herman .................... B04B 1/08 |
| | | 210/167.02 |

(Continued)

FOREIGN PATENT DOCUMENTS

WO    WO-2018/106539    6/2018

OTHER PUBLICATIONS

International Search Report and Written Opinion issued for PCT/US2019/041364, dated Sep. 19, 2019, 7 pages.
(Continued)

*Primary Examiner* — Robert Clemente
*Assistant Examiner* — Hafiz Muhammad Aamir
(74) *Attorney, Agent, or Firm* — Foley & Lardner LLP

(57) ABSTRACT

A separation assembly comprises a housing and a bearing plate assembly. The housing contains a turbine assembly and a rotor portion and defines a fluid inlet and a fluid outlet. The bearing plate assembly is adjustably attachable to the housing and defines a drive jet that directs fluid from the fluid inlet to the turbine assembly. The bearing plate assembly is mountable to the housing in multiple different orientations such that the relative position of the fluid inlet of the housing and the drive jet of the bearing plate assembly is adjustable.

16 Claims, 7 Drawing Sheets

(51) Int. Cl.
*B04B 5/00* (2006.01)
*B04B 9/12* (2006.01)
*F01M 13/04* (2006.01)

(52) U.S. Cl.
CPC ............... *B04B 5/005* (2013.01); *B04B 9/12* (2013.01); *F01M 13/04* (2013.01); *F01M 2013/0422* (2013.01)

(56) References Cited

U.S. PATENT DOCUMENTS

| | | | |
|---|---|---|---|
| 6,213,929 B1 * | 4/2001 | May | B04B 5/005 494/24 |
| 8,794,222 B2 | 8/2014 | Schwandt et al. | |
| 9,216,423 B2 | 12/2015 | Eliasson | |
| 9,322,307 B2 | 4/2016 | Andersson Aginger | |
| 2007/0249479 A1 | 10/2007 | Eliasson et al. | |
| 2010/0180854 A1 | 7/2010 | Baumann et al. | |
| 2012/0174537 A1 | 7/2012 | Tornblom et al. | |
| 2017/0043283 A1 * | 2/2017 | Agrawal | B01D 35/30 |
| 2019/0176076 A1 | 6/2019 | Wood et al. | |

OTHER PUBLICATIONS

First Office Action issue for Indian Patent Application No. IN 202147001506 dated Aug. 23, 2021, 6 pages.

* cited by examiner

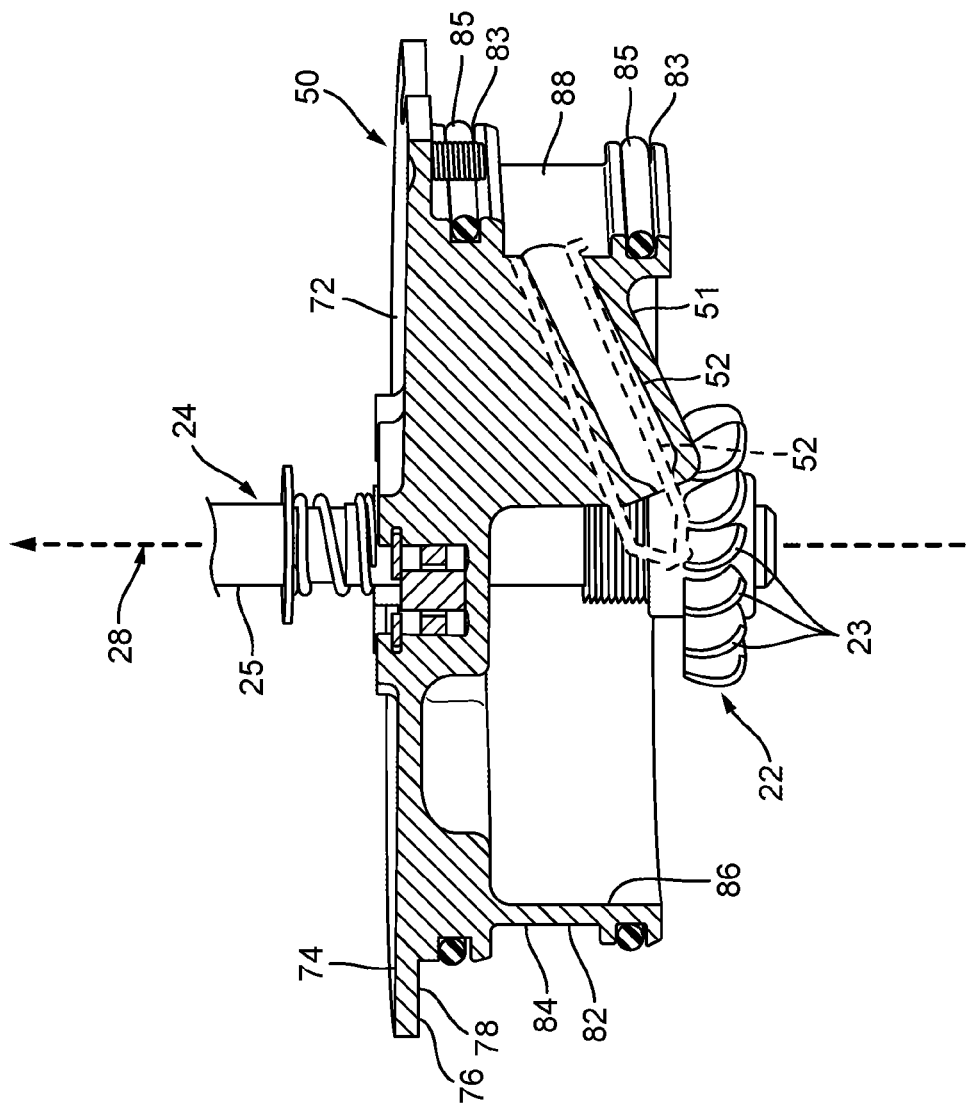

Section A-A

Section B-B

BEARING PLATE ASSEMBLY WITH A DRIVE JET FOR A SEPARATION ASSEMBLY

CROSS-REFERENCE TO RELATED PATENT APPLICATIONS

This application is a continuation of PCT Application No. PCT/US2019/041364, filed Jul. 11, 2019, which claims priority to and the benefit of Indian Provisional Application No. 201841026032, filed on Jul. 12, 2018. The contents of these applications are hereby incorporated by reference in their entirety.

FIELD

The present application relates generally to drive jets for separation assemblies.

BACKGROUND

Conventional hydraulic rotating crankcase ventilation (hRCV) systems may include an impulse turbine assembly. An impulse turbine assembly is a rotary system where the flow of fluid from a jet rotates a turbine, thereby converting hydraulic energy from the flow of fluid into rotational energy and converting hydraulic power (where hydraulic power is equal to the pressure times the flow) to mechanical power (where mechanical power is equal to the torque times the speed). Accordingly, impulse turbine assemblies can be used to power various devices, such as rotating filtration or separation devices. For example, impulse turbine assemblies can be used to power centrifuges (e.g., liquid-particle separators) or air-oil separators (e.g., crankcase ventilation devices). There are various types of impulse turbine assemblies such as Turgo-style or Pelton-style turbine assemblies (and various modifications for each style).

In a hydraulically-driven crankcase ventilation system, a rotor portion (e.g., filter element) is spun with a turbine and a pressurized jet. Generally, the higher the turbine power conversion efficiency, the higher the rotational speed of the filter element, and higher rotational speed of the filter element results in greater filter efficiency.

FIG. 1 shows an example of a conventional fluid separation assembly 120 in a conventional hRCV system that includes an impulse turbine assembly (not shown). The conventional separation assembly 120 comprises a housing 130 that comprises a filter cover 132 and a base 134 and that houses both the rotor portion (that includes a filter element 126 with a filter media 127) and the impulse turbine assembly. The base 134 of the housing 130, which contains or houses the impulse turbine assembly, defines an integrated oil inlet 142 (which provides an area for the oil inlet fluid flow 143) and an integrated impulse drive jet 152 (which provides an area for the oil or impulse drive jet fluid flow 153) (both of which are integrated into the base 134). The oil inlet 142 interfaces with an engine and allows oil to enter into the base 134 and into and through the drive jet 152. The drive jet 152 directs oil to the impulse turbine assembly within the base 134 in order to rotate the impulse turbine assembly. However, the oil inlet fluid flow 143 through this oil inlet 142 is in approximately the same direction as the impulse drive jet fluid flow 153 through the drive jet 152. In particular, the axes of the inlet fluid flow 143 and the drive jet fluid flow 153 of conventional hRCV systems are less than approximately 45° relative to each other. This causes the drive jet fluid flow 153 to point in a direction approximately opposite to the drainback direction 145 of drainage fluid flow of the drive oil through the oil outlet or drain, which may disrupt the return of oil to the engine.

Alternatively, conventional hRCV separation assemblies may have multiple drilled holes with corresponding plugs in order to provide multiple different oil passages and direct oil from the engine, around the filter chamber, and back towards the engine. However, this configuration requires multiple different drilling directions, multiple plugs, and a relatively larger size of the system in order to accommodate the multiple oil passages.

SUMMARY

Various embodiments provide for a separation assembly that comprises a housing and a bearing plate assembly. The housing contains a turbine assembly and a rotor portion and defines a fluid inlet and a fluid outlet. The bearing plate assembly is adjustably attachable to the housing and defines a drive jet that directs fluid from the fluid inlet to the turbine assembly. The bearing plate assembly is mountable to the housing in multiple different orientations such that the relative position of the fluid inlet of the housing and the drive jet of the bearing plate assembly is adjustable.

Various other embodiments provide for a bearing plate assembly adjustably attachable to a housing containing a turbine assembly and a rotor portion. The housing defines a fluid inlet and a fluid outlet. The bearing plate assembly comprises a bearing plate for adjustably attaching to the housing. The bearing plate assembly defines a drive jet that directs fluid from the fluid inlet to the turbine assembly. The bearing plate assembly is mountable to the housing in multiple different orientations such that the relative position of the drive jet of the bearing plate assembly to the fluid inlet of the housing is adjustable.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 3 is a cross-sectional view of a bearing plate assembly of the separation assembly of FIG. 2A.

DETAILED DESCRIPTION

Referring to the figures generally, various embodiments disclosed herein relate to a separation assembly that includes a bearing plate assembly that is configured to decouple the fluid flow through the fluid inlet from the fluid flow through the drive jet, thereby allowing the drive jet to point in any direction, regardless of the geometry of the fluid inlet.

Due to the bearing plate assembly, the drive fluid (such as drive oil) can be drained directly from the drive chamber (that houses the turbine assembly) of the housing of the separation assembly into the engine. Accordingly, the bearing plate assembly may allow the separation assembly to have smaller-sized components (such as a smaller drive chamber) with a given oil flow, which improves the drive oil management and drainage.

Separation Assembly

Figure 2A:
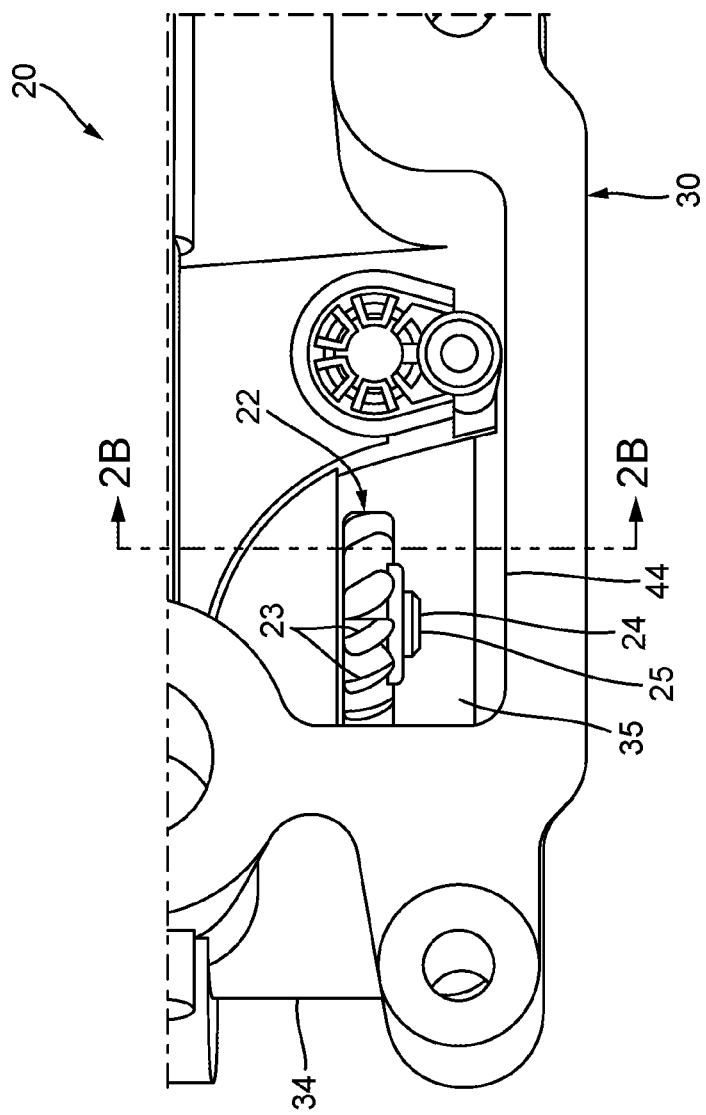
FIG. 2A is a side view of a separation assembly with a turbine assembly within a drive chamber of a base of a housing according to one embodiment.
Figure 2B:
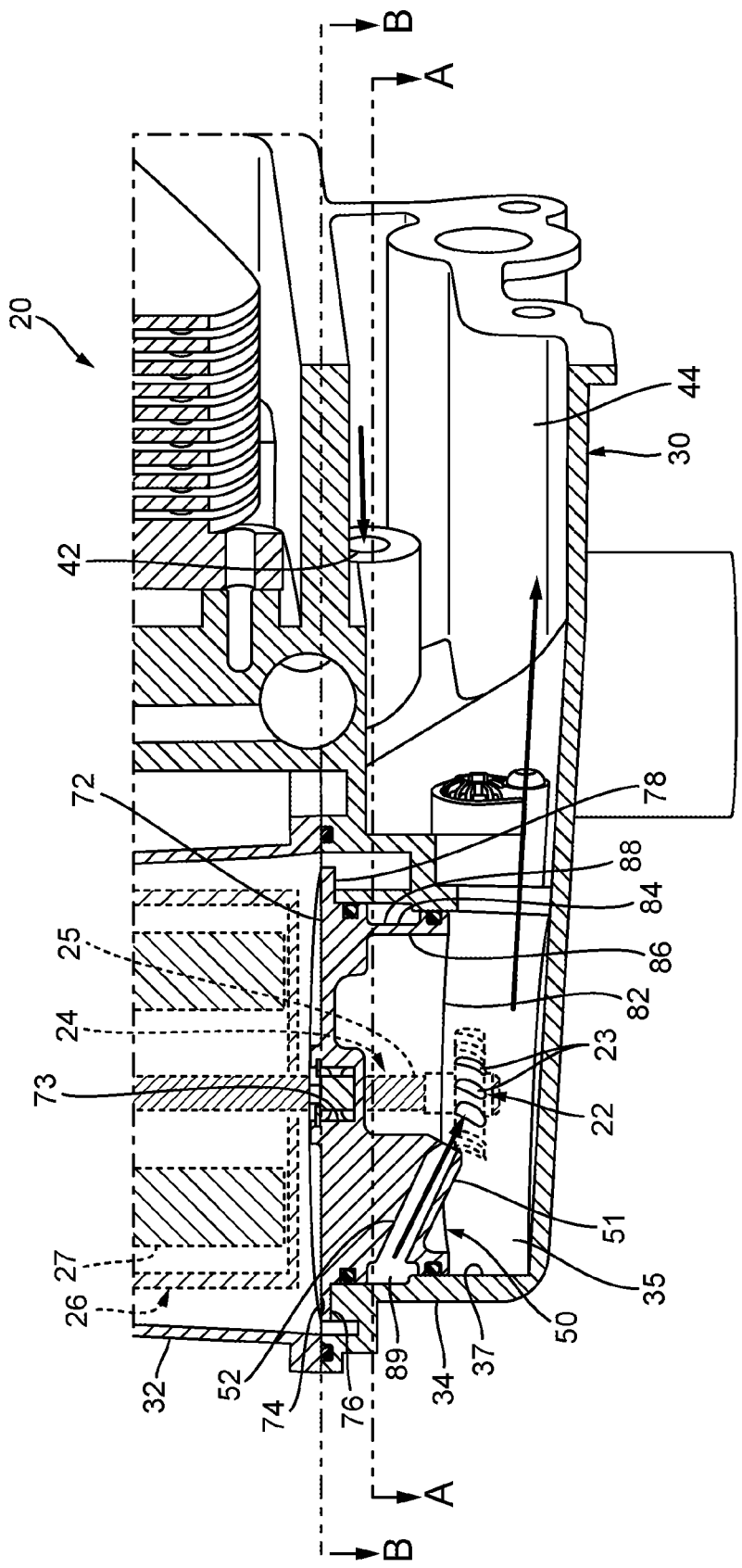
FIG. 2B is a cross-sectional, partially transparent view through Section 2B-2B of the separation assembly of FIG. 2A.

FIGS. 2A-2B show a filter or separation assembly 20 that comprises a housing 30, an impulse jet turbine assembly 22, and a rotor portion 24 (also partially shown in FIG. 3) that is hydraulically driven and that the turbine assembly 22 is configured to rotate. As described further herein and shown in FIG. 2B, the separation assembly 20 further comprises a bearing plate assembly 50 that is configured to direct the flow of fluid from the fluid inlet 42 toward the turbine assembly 22. Although oil is referred to herein, it is understood that a variety of different fluids may be used within the separation assembly, depending on the desired use.

The separation assembly 20 may utilize a variety of different separation technologies, including but not limited to plates, channels, and various cylindrical filter media. For example, according to one embodiment, the separation assembly 20 comprises a cone or disc stack separator. According to another embodiment, the separation assembly 20 comprises an involute plate/channel stack separator.

The separation assembly 20 may comprise a variety of different rotating filtration or separation devices, including but not limited to a lube-oil-driven product, a centrifuge (such as a rotating aerosol or particle separation device, a liquid-particle separator, an aerosol separator, a liquid centrifuge (with a lube bypass), etc.), an inertial separator, a lube-oil separator, and an air-oil separator (such as a rotating crankcase ventilation air-oil separator (that is, for example, media-based, axial-channel based, involute based, etc.), a crankcase blowby oil separator, or a rotating crankcase air-oil separator). The separation assembly 20 may be used as a lube-oil centrifuge as described, for example and according to one embodiment, in U.S. Pat. No. 6,017,300, the entire disclosure of which is incorporated herein by reference. The separation assembly 20 may be used for air filtration and/or for emissions and may be hydraulically driven. Further, the separation assembly 20 may be mounted to or used within an engine, such as a diesel engine that requires a hydraulic rotating crankcase ventilation (HRCV) system.

Rotor Portion

As shown in FIGS. 2B-3, the rotor portion 24 can comprise a variety of different rotatable portions within the separation assembly 20 and may comprise, for example, a cone stack, spiral vane, or media type filter element 26 (that comprises a filter media 27) in order to filter a fluid and a rod or shaft 25. The filter element 26 and the shaft 25 may be rotatably fixed to each other. The shaft 25 rotatably connects the turbine assembly 22 to the filter element 26 such that any rotation of the turbine assembly 22 causes the filter element 26 to rotate accordingly and congruently (optionally, the turbine assembly 22 and the filter element 26 may be rotationally fixed together). The shaft 25 and the filter element 26 are rotatable within and relative to the housing 30 in order to, for example, filter or separate a fluid. The rotor portion 24 is configured to be inexpensively rotated or otherwise driven by the turbine assembly 22.

The filter element 26 is positioned within the filter cover 32 of the housing 30, and the shaft 25 extends into both the filter cover 32 and the base 34 in order to connect the filter element 26 and the turbine assembly 22. In particular, the lower end of the shaft 25 is positioned within the base 34 of the housing 30 (and is attached to and extends through both the bearing plate assembly 50 and the turbine assembly 22), and the upper end of the shaft 25 is positioned within the filter cover 32 of the housing 30 (and is attached to and extends through the filter element 26). When assembled, the shaft 25 rotates with the turbine assembly 22 and the filter element 26, relative to the bearing plate assembly 50 and the housing 30.

Turbine Assembly

Figure 5:
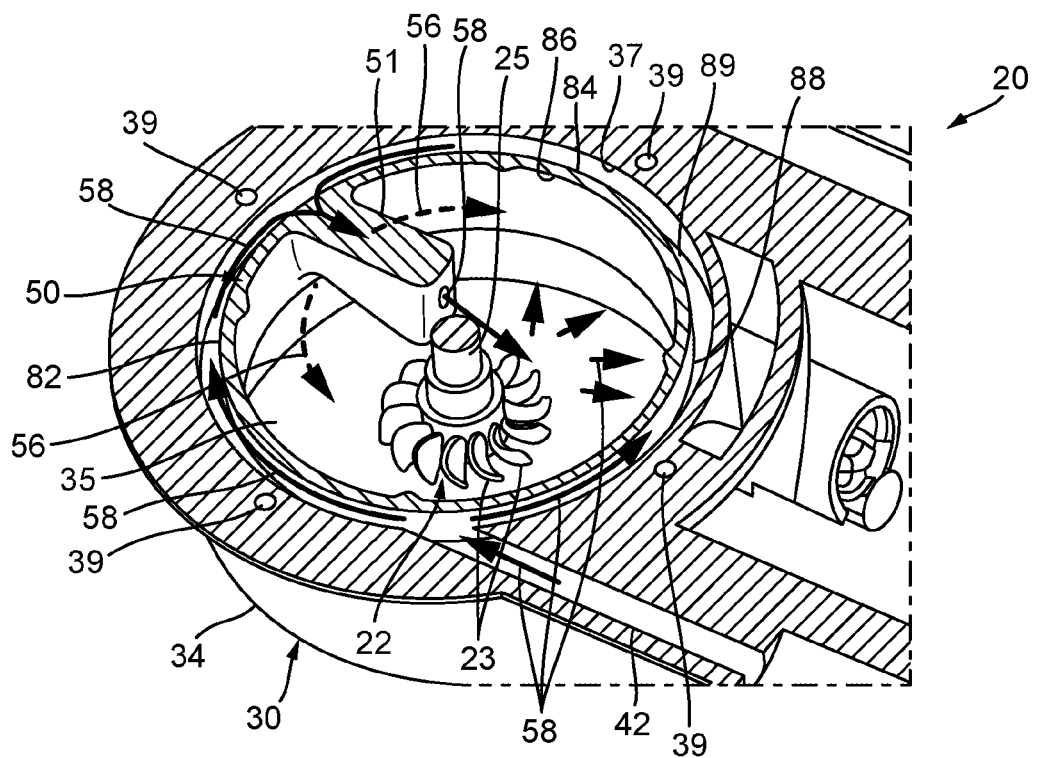
FIG. 5 is a top, cross-sectional view through Section A-A of the separation assembly of FIG. 2B.

As shown in FIGS. 2B, 3, and 5, the hydraulic, impulse drive wheel or turbine assembly 22 is a rotatable component within the separation assembly 20 that is driven or rotated by the fluid from the drive jet 52 (as described further herein) in order to rotate the rotor portion 24 within the separation assembly 20. More specifically, the turbine assembly 22 is attached and rotatably fixed to a lower end of the shaft 25 of the rotor portion 24 (and the lower end of the shaft 25 extends through the center aperture of the turbine assembly 22). The turbine assembly 22 may be positioned below the bearing plate assembly 50 (i.e., closer to the lower end of the shaft 25 and on a side of the bearing plate assembly 50 opposite the filter element 26) along the length of the shaft 25. As shown in FIGS. 2A-2B, the turbine assembly 22 is positioned within the drive chamber 35 of the base 34 of the housing 30 so as to be contacted, rotated, or hydraulically driven by the fluid expelled from the drive jet 52 (as shown in FIG. 2B). The turbine assembly 22 thus rotates or drives the rotor portion 24 such that rotation of the rotor portion 24 is directly correlated to rotation of the turbine assembly 22.

As shown in FIGS. 3 and 5, the turbine assembly 22 comprises at least one vane 23 (preferably a plurality of vanes 23) that are positioned about the circumference of the turbine assembly 22 and are configured to temporarily capture at least a portion of the fluid from the drive jet 52. The force of the incoming fluid from the drive jet 52 onto the vanes 23 causes the turbine assembly 22 (and thus the rotor portion 24) to rotate about a center rotational axis 28 (as shown in FIG. 3) within the housing 30 of the separation assembly 20, thereby converting the hydraulic power of the fluid from the drive jet 52 into mechanical power.

The turbine assembly 22 is used to convert hydraulic power into mechanical power, where hydraulic power=pressure*flow and mechanical power=torque*speed. Accordingly, the turbine assembly 22 receives a flow of fluid from the drive jet 52 at a high velocity. The fluid momentum flux of the fluid is transferred to the turbine assembly 22 as an impulse force, which then rotates the turbine assembly 22 with some associated losses (e.g., losses associated with the conversion of power from hydraulic to rotational). Accordingly, the turbine assembly 22 imparts a "change in momentum" or "impulse" on the fluid, thereby converting the momentum of the fluid into a force or torque, which rotates the turbine assembly 22 and thus rotates the rotor portion 24. The rotational speed of the turbine assembly 22 may vary according to the desired configuration.

Housing

As shown in FIG. 2B (in view of FIG. 3), the turbine assembly 22 and the rotor portion 24, as well as the bearing plate assembly 50, are positioned and contained within and rotatable within the housing 30. Accordingly, the housing 30 may comprise an upper portion (referred to herein as the filter cover 32) and a lower portion (referred to herein as the base 34) that are removably attachable to, detachable from, and reattachable to each other and are configured to contain the turbine assembly 22, the rotor portion 24, and the bearing plate assembly 50. The filter cover 32 may house or contain at least a portion of the rotor portion 24 (i.e., the filter element 26 and the upper end of the shaft 25), and the base 34 comprises a circumferential inner surface 37 that defines a drive chamber 35 that houses or contains the lower end of the shaft 25, the turbine assembly 22, and the bearing plate assembly 50. As described further herein, the inner surface 37 of the base 34 is configured to form a seal with the bearing plate assembly 50. The shaft 25 of the rotor portion 24 may extend into both the filter cover 32 and the base 34.

As shown in FIG. 2B, the housing 30 defines a fluid inlet 42 (such as an oil inlet) that may interface with an engine and allows fluid (such as oil) to enter into the interior area of the housing 30 (in particular into the drive chamber 35 of the base 34 of the housing 30 where the turbine assembly 22 is positioned) in order to drive or rotate the turbine assembly 22. The housing 30 also defines a fluid outlet 44 (such as an oil drain or outlet) that allows fluid (such as oil) to be drained from within the drive chamber 35 of the base 34 of the housing 30 after (and/or during) driving or rotating the turbine assembly 22.

Bearing Plate Assembly

The bearing plate assembly 50 is configured to adjustably attach or be mounted to the housing 30 (in particular to the inner surface 37 of the walls of the base 34 that defines the drive chamber 35) in order to adjustably direct the fluid flow from the fluid inlet 42 to the turbine assembly 22. As shown in FIG. 2B, the bearing plate assembly 50 is positionable within the drive chamber 35 of the base 34 of the housing 30. Accordingly, the bearing plate assembly 50 comprises a bearing plate 72 (as described further herein) that is configured to allow the bearing plate assembly 50 to be mounted to the housing 30 in multiple different orientations and a circumferential extension 82 (as described further herein) that allows the bearing plate assembly 50 to be removably attached and secured to the housing 30. The bearing plate assembly 50 also comprises an inner extension 51 that, together with the circumferential extension 82, defines a drive jet 52 (as described further herein) that is configured to direct fluid from the fluid inlet 42 to the interior area of the housing 30 (i.e., to the turbine assembly 22). The bearing plate 72, the circumferential extension 82, and the inner extension 51 may be integrally formed or constructed as a single-piece with each other as a single unitary component that cannot be separated without destruction.

A portion of the rotor portion 24, such as a lower end portion of the shaft 25 (above the turbine assembly 22), may extend through the bearing plate assembly 50. As the turbine assembly 22 is positioned along and attached to the lower end of the shaft 25, the bearing plate assembly 50 is positioned between the turbine assembly 22 and the filter element 26 of the rotor portion 24 along the length of the shaft 25.

Bearing Plate

As shown in FIGS. 2B-3, the bearing plate 72 extends along a plane substantially perpendicular to the shaft 25 and the center rotational axis 28 of the turbine assembly 22 and is configured to be adjustably attached and secured to the base 34 of the housing 30 (as described further herein). The bearing plate 72 comprises a filter side 74 and a turbine side 76 that are directly opposite each other (along the direction of the center rotational axis 28). As shown in FIG. 2B, the filter side 74 faces toward the filter element 26, and the turbine side 76 faces toward the turbine assembly 22. As described further herein, the bearing plate 72 further comprises an outer lip 78 (along the outer edge of the bearing plate 72) in order to adjustably attach to the base 34 of the housing 30. The lip 78 extends over and attaches to a top side of the base 34 (that extends between the inner surface 37 and the outer surface of the base 34 and faces toward the filter cover 32).

Figure 6:
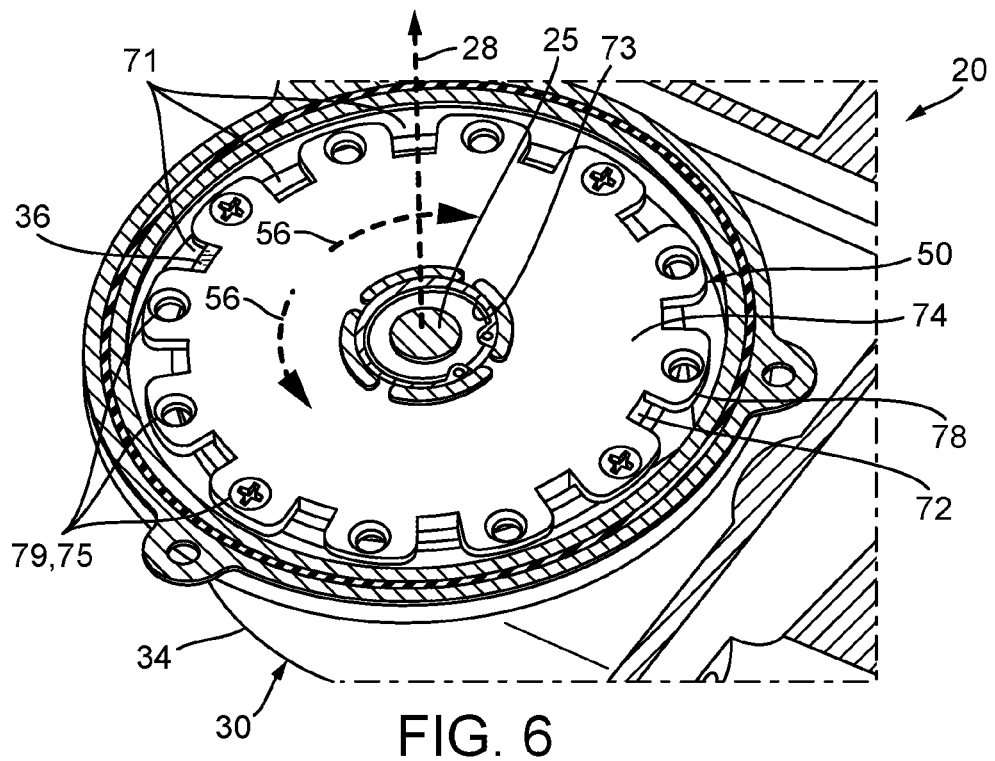
FIG. 6 is a top, cross-sectional view through Section B-B of the separation assembly of FIG. 2B.

As shown in FIGS. 2B and 6, the bearing plate 72 defines a center hole 73 (that extends completely through the bearing plate 72). The center hole 73 provides an area to receive a portion of the rotor portion 24 (in particular a portion of the shaft 25) such that the rotor portion 24 can extend through and along opposite sides of the bearing plate 72. The center hole 73 and the rotor portion 24 are sized and configured to allow the rotor portion 24 (in particular the shaft 25) to rotate within the center hole 73 (relative to the bearing plate 72) without allowing fluid to flow through the center hole 73.

Circumferential Extension

As further shown in FIGS. 2B-3, the circumferential extension 82 extends from the turbine side 76 of the bearing plate 72, in a direction away from the filter element 26 and toward the turbine assembly 22 and is sealable with the inner surface 37 of the base 34 of the housing 30, as described further herein. The circumferential extension 82 comprises an outer surface 84 and an inner surface 86 that are directly opposite each other (where the outer surface 84 is radially outward from the inner surface 86). The circumferential extension 82 extends completely around the shaft 25 and the portion of the bearing plate 72 radially inward from the lip 78. In particular, the circumferential extension is spaced inwardly from the outer edge of the bearing plate 72 in order to create the lip 78 of the bearing plate 72 (accordingly, the lip 78 extends radially outward from the outer surface 84 of the circumferential extension 82).

As shown in FIG. 3, the outer surface 84 of the circumferential extension 82 defines a circumferential groove 88 that extends around the entire outer perimeter of the outer surface 84 of the circumferential extension 82 and directs fluid from the fluid inlet 42 of the housing 30 into the drive jet 52 of the bearing plate assembly 50 along the outer surface 84 of the circumferential extension 82, as described further herein. When attached to the base 34 of the housing 30, the circumferential groove 88 is recessed relative to the inner surface 37 of the base 34 such that there is gap 89 between the outer surface 84 of the circumferential extension 82 (in the area along the circumferential groove 88) and the inner surface 37 of the base 34 through which fluid from the fluid inlet 42 can flow through and subsequently into the drive jet 52.

In order to prevent any leakage between the fluid inlet 42 and the drive jet 52, the outer surface 84 of the circumferential extension 82 further defines at least two seal member grooves 83 that each extend along the entire outer perimeter of the outer surface 84 of the circumferential extension 82. The seal member grooves 83 are each configured to receive a seal member 85 of the bearing plate assembly 50 in order to form a seal between the inner surface 37 of the base 34 of the housing 30 and the outer surface 84 of the circumferential extension 82 and prevent fluid from leaking into or out from within the circumferential groove 88. One of the two seal member grooves 83 is positioned above the circumferential groove 88 (along the direction of the rotational axis 28) to prevent any fluid from flowing or leaking between the gap 89 and the area of the housing 30 containing the filter element 26, including the area within the filter cover 32. The other of the two seal member grooves 83 is positioned below the circumferential groove 88 (along the direction of the rotational axis 28) to prevent any fluid from flowing or leaking between the gap 89 and the lower portion of the base 34 (that contains the turbine assembly 22).

Inner Extension and Drive Jet

As shown in FIGS. 2B-3, the inner extension 51 of the bearing plate assembly 50 extends from the inner surface 86 of the circumferential extension 82 and from the turbine side 76 of the bearing plate 72. Accordingly, the inner extension 51 is positioned within an inner area of the bearing plate assembly 50 that is defined by the bearing plate 72 and the circumferential extension 82. At least a portion of the lower end portion of the shaft 25 extends through and is positioned within this same inner area of the bearing plate assembly 50.

As shown in FIGS. 2B-3, the drive jet 52 (which may be an integrated impulse tangential drive nozzle or jet) is integrated into and defined by the inner extension 51 and a portion of the circumferential extension 82 of the bearing plate assembly 50. In particular, the drive jet 52 extends completely through both the circumferential groove 88 of the circumferential extension 82 (i.e., through the outer surface 84 of the circumferential extension 82) and the inner extension 51 in order to provide a fluid flow path from the fluid inlet 42, through and along the gap 89 within the groove 88, and subsequently into and through the bearing plate assembly 50 (into and through the drive jet 52) to the turbine assembly 22.

The bearing plate assembly 50 is positioned near the turbine assembly 22 in order to position the pressurized and impinging or impulse fluid drive jet 52 near the turbine assembly 22, and thus to direct fluid from the fluid drive jet 52 toward and into the turbine assembly 22. In particular, the drive jet 52 directs and subsequently expels the fluid from the fluid inlet 42 into the base 34 of the housing 30, toward and into the turbine assembly 22 in order to rotate the turbine assembly 22 within the drive chamber 35 of the base 34 of the housing 30 and allow the turbine assembly 22 to power the rest of the separation assembly 20 by rotating the rotor portion 24 and thus the filter element 26.

The pressurized drive jet 52 expels a pressurized fluid (e.g., a drive liquid) from an end nozzle of the drive jet 52 toward the turbine assembly 22 (such as the top of the turbine assembly 22 according to one embodiment) to spin, rotate, or otherwise turn the turbine assembly 22. The end nozzle of the drive jet 52 has a smaller diameter than the body of the drive jet 52 (that is upstream from the end nozzle along the longitudinal length of the drive jet 52). The pressure or flow of the fluid through the drive jet 52 causes the turbine assembly 22 to rotate, thus transferring the kinetic energy (as created by conversion from pressure, per Bernoulli) of the flowing fluid from the drive jet 52 to the turbine assembly 22, which rotates the turbine assembly 22 (and thus rotates the rotor portion 24).

Since the turbine assembly 22 may be a Turgo-style turbine, the bearing plate assembly 50, and thus the drive jet 52, may be positioned above the turbine assembly 22 and angled downward (relative to a horizontal radial-tangential plane of the turbine assembly 22 that may be substantially perpendicular to the rotational axis 28) toward the turbine assembly 22 with the end nozzle of the drive jet 52 pointing and directing fluid toward and into the top end of the vanes of the turbine assembly 22. The particular angle of the longitudinal axis of the drive jet 52 relative to the turbine assembly 22 may vary according to the desired configuration (as shown in FIG. 3) and may or may not be in a plane that is perpendicular to the rotational axis 28 of the turbine assembly 22.

The fluid from the drive jet 52 may be, for example, a liquid. According to a more particular embodiment, the fluid from the drive jet 52 may be typical drive fluid such as oil (e.g., engine oil, lube oil, or hydraulic fluid). For example, the fluid may be pressurized engine lube oil with a relatively high working-temperature viscosity compared to water.

The turbine assembly 22 may have an impulse-bucket design that is Turgo-style. Accordingly, with a Turgo-style turbine assembly 22, the drive jet 52 is angled downward toward and onto the top entrance-face (i.e., the top end of the vanes) of the turbine assembly 22. In particular, the drive jet 52 is at an angle (i.e., a slight axial-downward tilt-angle) relative to a horizontal radial-tangential plane of the turbine assembly 22 (where the horizontal radial-tangential plane is perpendicular to the axial center rotational axis 28 of the turbine assembly 22). For example, the drive jet 52 may expel the fluid into the turbine assembly 22 at a finite approach angle (typically approximately 15-20°) from above or below. Comparatively, the turbine assembly 22 may be Pelton-style, in which the drive jet 52 is a straight tangential jet and is substantially parallel to (rather than at an angle to) the horizontal radial-tangential plane of the turbine assembly 22.

Fluid Flow Through the Bearing Plate Assembly

Figure 4:
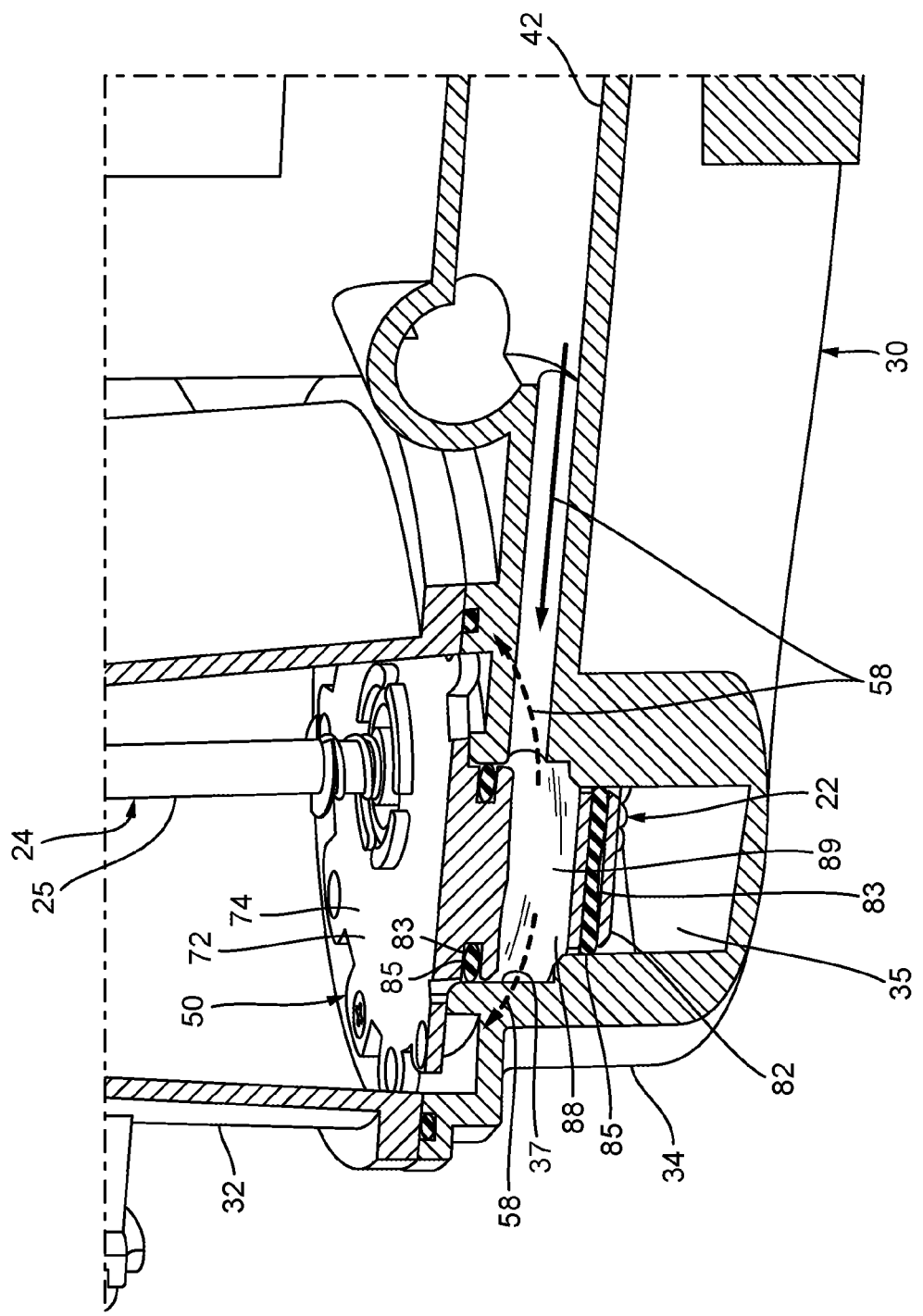
FIG. 4 is a cross-sectional view of a portion of the separation assembly of FIG. 2A with the filter element omitted.

As shown in FIGS. 4-5, the bearing plate assembly 50 directs the fluid from the fluid inlet 42 to the turbine assembly 22 (where the fluid flow is indicated by flow lines 58). In particular, due to the relative positioning of the circumferential groove 88, the fluid inlet 42, and the inner surface 37 of the base 34 of the housing 30, the fluid first flows through the fluid inlet 42 of the housing 30, into the groove 88 of the bearing plate assembly 50 (i.e., into and through the gap 89 between the outer surface 84 of the circumferential extension 82 and the inner surface 37 of the base 34), along the length of the groove 88 and around at least a portion of the outer perimeter of the circumferential extension 82 and the inner perimeter of base 34 of the housing 30) until the fluid reaches the drive jet 52 of the bearing plate assembly 50. As shown in FIGS. 4-5, the fluid flows in both directions around the outer circumference of the bearing plate assembly 50 to reach the drive jet 52. The fluid then subsequently flows into and through the drive jet 52 (i.e., through the circumferential extension 82 and the inner extension 51) (as shown in FIG. 5), after which the fluid is directed out from the drive jet 52 and toward and into the turbine assembly 22. After the fluid flows into the turbine assembly 22 (which rotates the turbine assembly 22 and thus the rotor portion 24), the fluid flows radially out from the turbine assembly 22 within the drive chamber 35 of the base 34 of the housing 30 and subsequently exits out through the oil outlet 44 (shown in FIG. 2B).

Adjustability of the Bearing Plate Assembly

In order to decouple the direction of the fluid flow flowing within and exiting from the drive jet 52 into the turbine assembly 22 from the direction of fluid flow flowing from the fluid inlet 42, the bearing plate assembly 50 is adjustably attachable and mountable to the housing 30 in multiple different mounting orientations, according to the desired direction of fluid through the drive jet 52. For example, as shown in FIGS. 5-6, prior to attachment, the bearing plate assembly 50 can be rotated in either direction (as indicated by the rotational lines 56) about the rotational axis 28 (as shown in FIG. 6) within the base 34 in order to position the drive jet 52 in the desired position. This configuration allows the relative position of the fluid inlet 42 of the housing 30 and the drive jet 52 of the bearing plate assembly 50 to be adjusted. For example, the drive jet 52 may be positioned on the same side or the opposite side (or different sides) as the fluid inlet 42 (or any position therebetween), such that, after flowing out from the fluid inlet 42, the fluid either flows directly from the fluid inlet 42 into the drive jet 52 (in the same direction) or flows around at least a portion of the outer perimeter of the bearing plate assembly 50 before flowing into the drive jet 52 (in opposite or different directions). Accordingly, the fluid flow through the drive jet 52 can be directed in multiple different potential directions (according to the mounting position of the bearing plate 72 and regardless of the direction of fluid flow through the fluid inlet 42) in order to optimize the spray direction.

In particular, the bearing plate assembly 50, and therefore the drive jet 52, are movably attachable to, removable from, and reattachable to the housing 30. Accordingly, the position of the drive jet 52 relative to the turbine assembly 22 can be adjusted, which allows the direction of fluid flow within and through the drive jet 52 to be decoupled from the direction of the fluid flow within and through the fluid inlet 42 of the housing 30. The drive jet 52 can point in any direction, regardless of the geometry of the fluid inlet 42. As shown in FIG. 2B, the fluid flow through the drive jet 52 may be in approximately the same direction as the fluid flow through the oil outlet 44 (i.e., the drive oil drainback direction) and in approximately the opposite direction as the fluid flow through the fluid inlet 42 (as further shown in FIG. 5). Alternatively, the fluid flow through the drive jet 52 may be in a different direction or in approximately the same direction as the fluid flow through the fluid inlet 42. In particular, the bearing plate assembly 50 is rotatable about the center rotational axis 28 of the turbine assembly 22 prior to being mounted to the housing 30 and secured into a variety of different positions about the center rotational axis 28.

Specifically, the bearing plate 72 of the bearing plate assembly 50 is attachable to the base 34 of the housing 30 in multiple different positions. The position of the bearing plate 72 is directly correlated to the position of the drive jet 52. The bearing plate 72 comprises multiple different areas or attachment features 79 along the lip 78 to attach and secure the bearing plate assembly 50 to the base 34 of the housing 30 such that the bearing plate assembly 50 can be oriented in multiple different orientations relative to the housing 30.

Figure 7:
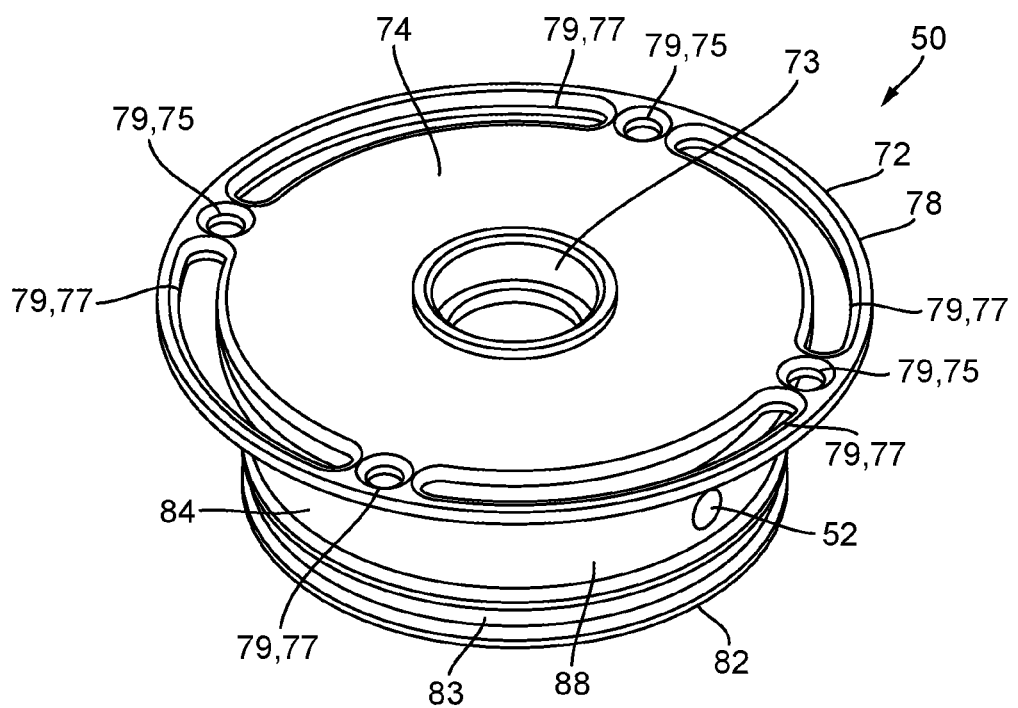
FIG. 7 is a perspective view of a bearing plate assembly according to one embodiment.
Figure 8:
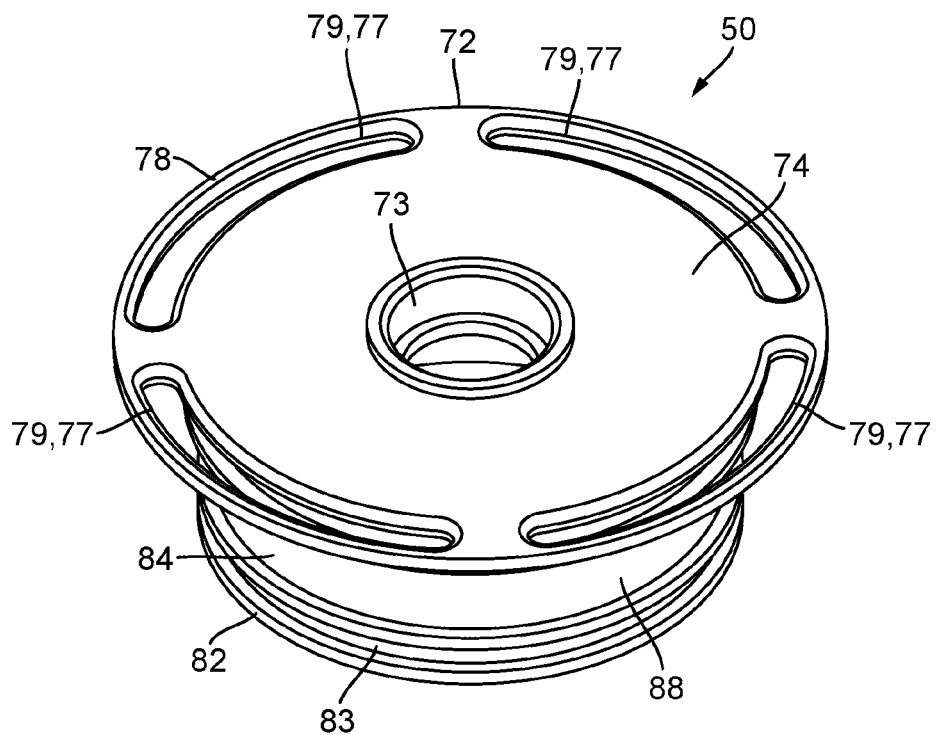
FIG. 8 is a perspective view of a bearing plate assembly according to another embodiment.

According to one embodiment as shown in FIG. 6, the attachment features 79 comprise multiple different through-holes 75 (and/or slots 77) that extend completely through the lip 78 of the bearing plate 72, and the base 34 also comprises attachment features 39 that comprise multiple different holes and/or slots. The attachment features 79 and 39 are each configured to receive a fastener (e.g., a screw). The fastener extends through the hole 75 or the slot 77 of the attachment feature 79 of the bearing plate 72 and into a portion (i.e., a hole of the attachment feature 39) of the housing 30 (e.g., the base 34 of the housing 30). For example, as shown in FIG. 6, the bearing plate 72 may include multiple holes 75 (and/or slots 77, as shown in FIGS. 7-8) around the outer perimeter of the bearing plate 72 (and along the lip 78). The holes 75 of the bearing plate 72 are spaced apart from each other by approximately 30°, which allows the bearing plate assembly 50 within the base 34 to be rotated, and therefore the position adjusted, in 30° increments. As shown in FIG. 5, the attachment features 39 of the base 34 also comprise multiple holes around the outer perimeter of the drive chamber 35 that are spaced apart from each other by approximately 90°.

In order to fasten the bearing plate assembly 50 to the base 34 of the housing 30, the holes 75 of the attachment features 79 in the bearing plate 72 are aligned with the holes of the attachment features 39 in the base 34 in the housing 30 according to the desired orientation of the bearing plate assembly 50 (as shown in FIG. 5) relative to the base 34 and subsequently receive the fasteners. These fasteners extend through both the holes 75 in the bearing plate 72 and the holes in the housing 30. The bearing plate 72 and the base 34 may include the same or a different number of attachment features, depending on the desired configuration.

According to another embodiment shown in FIG. 7, the attachment features 79 of the bearing plate 72 comprise both slots 77 and (circular) holes 75 that are configured to align with the holes of the attachment features 39 of the base 34 of the housing 30. According to yet another embodiment as shown in FIG. 8, the attachment features 79 of the bearing plate 72 only comprises slots 77 (and no circular holes). The slots 77 extend around at least a portion of the perimeter of the bearing plate assembly 50 such that the fastener can be positioned in any different area along the length of the slot 77 to allow the bearing plate assembly 50 to be positioned in any position (continuously) relative to the housing 30 along the slot 77. The slots 77 allow the bearing plate assembly 50 to be rotated and secured in any particular orientation (along the length of the slot 77) in order to achieve a specific and exact direction of fluid flow from the drive jet 52.

As shown in FIG. 6, the bearing plate 72 (and thus the bearing plate assembly 50) can be rotated within the base 34 of the housing 30 about the center rotational axis 28 of the turbine assembly 22 (relative to the housing 30) prior to attachment to the base 34, as shown by the rotational lines 56, and subsequently rotationally (and axially and tangentially) secured to the base 34 of the housing 30 with fasteners (e.g., screws) in the desired position. Since the drive jet 52 is integrated into the bearing plate assembly 50, as the bearing plate assembly 50 is rotated, the position of the drive jet 52 relative to the housing 30 (in particular relative to the fluid inlet 42) is adjusted and securable into different mounting positions about the center rotational axis 28 in order to be optimally oriented to examine and optimize the spray pattern of fluid off of the turbine assembly 22. If the position of the drive jet 52 is needed to be adjusted after the bearing plate assembly 50 has been secured to the base 34, the bearing plate assembly 50 can be released from the base 34 (by removing the fastener(s)), repositioned and rotated within the base 34, and subsequently resecured to the base 34 by refastening the fasteners.

Figure 1:
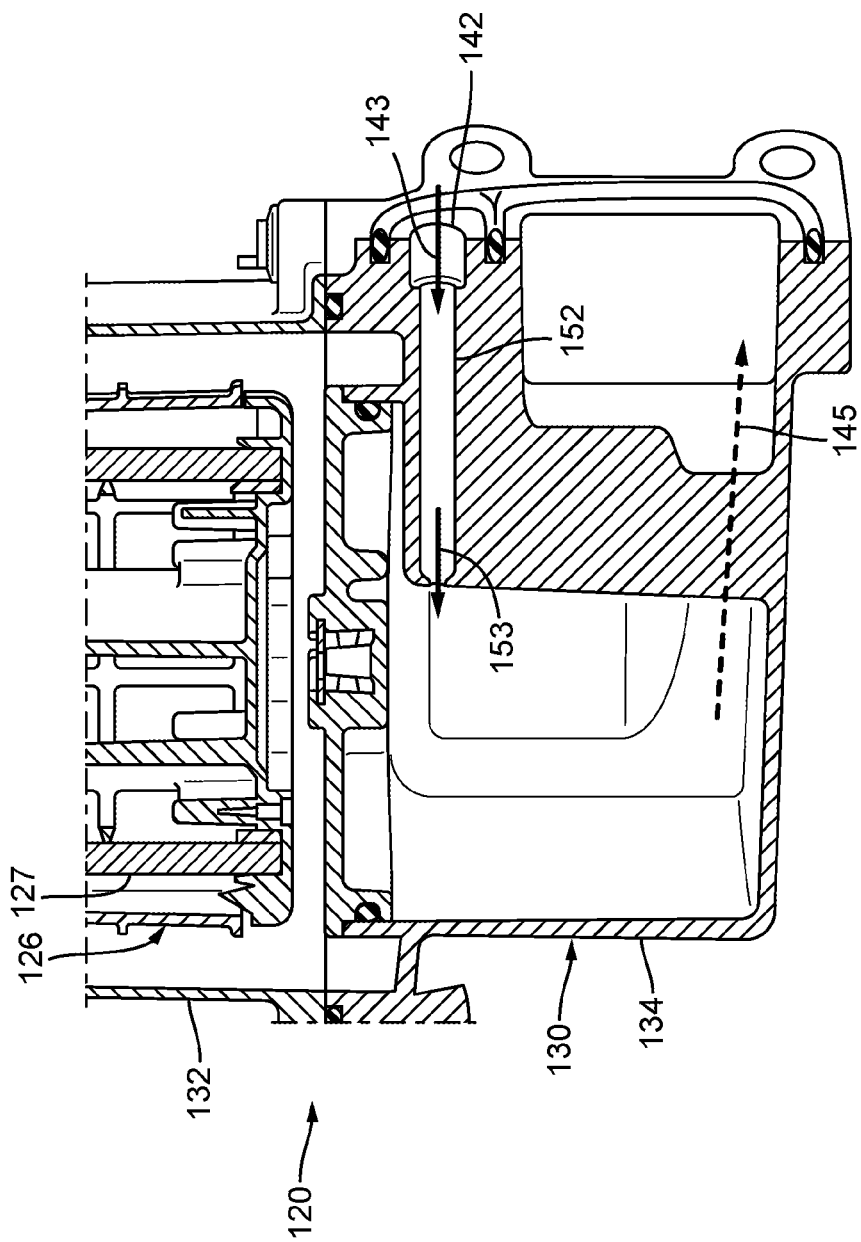
FIG. 1 is a cross-sectional view of a conventional separation assembly.

This configuration also allows the turbine assembly 22 that is Turgo-style to be relatively more easily assembled compared to a conventional separation assembly in which the drive jet 152 is integrated into the base 134 of the housing 130 (as shown in the conventional separation assembly 120 in FIG. 1).

By providing the drive jet 52 within the bearing plate assembly 50, the drive jet 52 can be positioned to overhang the turbine assembly 22 (as shown in FIG. 3), which optimizes the Turgo efficiency. Comparatively, in conventional separation assemblies 120 in which the drive jet 152 is integrated into the housing 130 (as shown in FIG. 1), it would have been much more difficult to assemble the turbine assembly and the rotor assembly such that the drive jet 152 overhangs the turbine assembly. For example, this configuration would have required a fixture to hold the Turgo in place while the shaft of the rotor assembly is moved through the bearing plate, threading the Turgo from above.

According to one embodiment as shown in FIG. 6, the bearing plate assembly 50 and the base 34 of the housing 30 are interlockable with each other such that the bearing plate assembly 50 can be positioned in (and rotationally fixed in) at least one particular relative rotational orientation or position relative to the base 34 of the housing 30. For example, the bearing plate assembly 50 and the base 34 may interlock with each other through a key-and-slot geometry. The interlocking key-and-slot geometry may optionally be asymmetrical such that the bearing plate assembly 50 can be positioned or mounted to the housing 30 in certain positions or orientations (or in only one position or orientation), but not in other positions or orientations.

In particular, the bearing plate 72 may define at least one slot, detent, indentation, or notch 71 on the lip 78. For example, a notch 71 may be positioned between two attachment features 79 of the bearing plate 72. The bearing plate 72 may define multiple notches 71 about the perimeter of the lip 78, each optionally positioned between two attachment features 79. The base 34 of the housing 30 comprises at least one key, tab, detent, or protrusion 36 that extends from the top surface of the base 34 (i.e., the surface between the inner surface 37 and the outer surface of the base 34, facing the filter cover 32) that fits within and interlocks with the notch 71. The base 34 may also define multiple protrusions 36 about the perimeter of the drive chamber 35. Depending on the relative number of notches 71 and protrusions 36, the notches 71 and the protrusions 36 allow for the bearing plate assembly 50 to be positioned in multiple different potential positions or orientations relative to the base 34. The notches 71 and the protrusions 36 are sized, shaped, and positioned to be complementary to each other such that one of the protrusions 36 fits into one of the notches 71, as shown in FIG. 7, to rotatably lock the bearing plate assembly 50 to the base 34 of the housing 30. Once the bearing plate assembly 50 has been oriented (or as the bearing plate assembly 50 is being oriented) relative to the base 34, the protrusions 36 are inserted into the notches 71, which ensures that the bearing plate assembly 50 is positioned in at least one particular position and prevents the bearing plate assembly 50 from rotating relative to the base 34.

If there is a particular orientation that the bearing plate assembly 50 should not be oriented in relative to the base 34, certain notches 71 can be filled in or otherwise absent from the bearing plate 72, thereby eliminating all but the desired assembly orientation (since the protrusion 36 can no longer extend through these areas). Although the protrusions 36 are shown to be a part of the base 34 and the notches 71 are shown to be a part of the bearing plate assembly 50, it is understood that, according to other embodiment, the notches 71 are a part of the base 34, and the protrusions 36 are a part of the bearing plate assembly 50 (or the base 34 and the bearing plate assembly 50 include a combination of notches 71 and protrusions 36).

As utilized herein, the terms "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A separation assembly comprising:
    a housing for containing a turbine assembly and a rotor portion, the housing defining a fluid inlet and a fluid outlet; and
    a bearing plate assembly adjustably attachable to the housing and defining an integrally formed fixed drive jet that directs fluid from the fluid inlet to the turbine assembly,
    the bearing plate assembly comprising a bearing plate with the fixed drive jet that is mountable to the housing in multiple different orientations such that the relative position of the fluid inlet of the housing and the drive jet of the bearing plate assembly is adjustable.

2. The separation assembly of claim 1, wherein the bearing plate extends along a plane substantially perpendicular to a rotational axis of the turbine assembly.

3. The separation assembly of claim 2, wherein the housing comprises a base for containing the turbine assembly and a filter cover for containing a filter element, wherein the bearing plate comprises a lip that extends over and attaches to a top side of the base of the housing, the top side of the base facing towards the filter cover.

4. The separation assembly of claim 2, wherein the bearing plate defines a center hole that receives a portion of a shaft of the rotor portion such that the shaft can rotate within the center hole.

5. The separation assembly of claim 2, wherein an outer lip of the bearing plate comprises at least one attachment feature that is configured to attach and secure the bearing plate assembly to the housing.

6. The separation assembly of claim 5, wherein the at least one attachment feature comprises at least one of a through-hole or a slot that is configured to receive a fastener that extends through the at least one attachment feature and into a portion of the housing.

7. The separation assembly of claim 2, wherein the bearing plate assembly comprises a circumferential extension extending from a turbine side of the bearing plate and sealable with an inner surface of the housing.

8. The separation assembly of claim 2, wherein the bearing plate and the housing are interlockable with each other such that the bearing plate can be positioned in and rotationally fixed in at least one rotational position relative to the housing.

9. The separation assembly of claim 8, wherein the bearing plate defines at least one notch and the housing comprises at least one protrusion that interlocks with the at least one notch to rotatably lock the bearing plate assembly to the housing.

10. The separation assembly of claim 1, wherein the direction of fluid flow through the drive jet is decoupled from the direction of fluid flow through the fluid inlet.

11. The separation assembly of claim 1, wherein the bearing plate assembly is rotatable within the housing about a rotational axis of the turbine assembly prior to attachment.

12. A separation assembly comprising:
a housing for containing a turbine assembly and a rotor portion, the housing defining a fluid inlet and a fluid outlet; and
a bearing plate assembly adjustably attachable to the housing and defining a drive jet that directs fluid from the fluid inlet to the turbine assembly,
the bearing plate assembly mountable to the housing in multiple different orientations such that the relative position of the fluid inlet of the housing and the drive jet of the bearing plate assembly is adjustable,
the bearing plate assembly comprising a bearing plate for adjustably attaching to the housing, the bearing plate extending along a plane substantially perpendicular to a rotational axis of the turbine assembly,
the bearing plate assembly comprising a circumferential extension extending from a turbine side of the bearing plate and sealable with an inner surface of the housing,
wherein an outer surface of the circumferential extension defines a circumferential groove that extends around the entire outer perimeter of the circumferential extension and directs fluid flow from the fluid inlet to the drive jet along the outer surface of the circumferential extension.

13. The separation assembly of claim 12, wherein the outer surface of the circumferential extension further defines at least two seal member grooves that each extend around the entire outer perimeter of the circumferential extension and receive a seal member to form a seal between an inner surface of the housing and the outer surface of the circumferential extension, wherein one of the two seal member grooves is positioned above the circumferential groove and the other of the two seal member grooves is positioned below the circumferential groove.

14. A separation assembly comprising:
a housing for containing a turbine assembly and a rotor portion, the housing defining a fluid inlet and a fluid outlet; and
a bearing plate assembly adjustably attachable to the housing and defining a drive jet that directs fluid from the fluid inlet to the turbine assembly,
the bearing plate assembly mountable to the housing in multiple different orientations such that the relative position of the fluid inlet of the housing and the drive jet of the bearing plate assembly is adjustable,
the bearing plate assembly comprising a bearing plate for adjustably attaching to the housing, the bearing plate extending along a plane substantially perpendicular to a rotational axis of the turbine assembly,
the bearing plate assembly comprising a circumferential extension extending from a turbine side of the bearing plate and sealable with an inner surface of the housing,
wherein the bearing plate assembly further comprises an inner extension that extends from an inner surface of the circumferential extension and a turbine assembly side of the bearing plate, wherein the inner extension and the circumferential extension together define the drive jet.

15. The separation assembly of claim 14, wherein the drive jet extends completely through the outer surface of the circumferential groove and the inner extension.

16. The separation assembly of claim 14, wherein the bearing plate, the circumferential extension, and the inner extension are integrally formed with each other.

* * * * *